US009757899B2

(12) United States Patent
Ruegg (10) Patent No.: US 9,757,899 B2
(45) Date of Patent: Sep. 12, 2017

(54) DEVICE AND METHOD FOR SEALING OVERLAPPING PACKAGING PARTS

(71) Applicant: SIG Technology AG, Neuhausen am Rheinfall (CH)

(72) Inventor: Martin Ruegg, Uhwiesen (CH)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/027,823

(22) PCT Filed: Sep. 30, 2014

(86) PCT No.: PCT/EP2014/070897
§ 371 (c)(1),
(2) Date: Apr. 7, 2016

(87) PCT Pub. No.: WO2015/052040
PCT Pub. Date: Apr. 16, 2015

(65) Prior Publication Data
US 2016/0243756 A1    Aug. 25, 2016

(30) Foreign Application Priority Data
Oct. 11, 2013    (DE) .......................... 10 2013 111 230

(51) Int. Cl.
*B32B 37/00* (2006.01)
*B29C 65/00* (2006.01)
(Continued)

(52) U.S. Cl.
CPC ...... *B29C 66/81463* (2013.01); *B29C 33/485* (2013.01); *B29C 65/02* (2013.01);
(Continued)

(58) Field of Classification Search
CPC ............ B65B 51/225; B29C 66/81463; B29C 66/1122; B29C 66/542; B29C 66/63; B29C 66/8161; B29C 65/08
(Continued)

(56) References Cited

U.S. PATENT DOCUMENTS 4,640,733 A    2/1987 Bogren
4,724,654 A    2/1988 Dahlin et al.
(Continued)

FOREIGN PATENT DOCUMENTS

CN    1173853 A    2/1998
CN    1343172 A    4/2002
(Continued)

*Primary Examiner* — James Sells
(74) *Attorney, Agent, or Firm* — The Webb Law Firm (57) ABSTRACT

A device and method for the fluid-tight sealing of two partially overlapping packaging components, one being a tubular base member formed from a blank of composite cardboard/plastics material, and an additional packaging component forming the upper packaging portion or packaging base, having at least one mandrel and one die, the mandrel having at least two expansion elements which are moved from the operating position thereof towards each other into a rest position, the expansion elements having sealing jaws which, in the operating position thereof, form a closed circumferential outer contour, which corresponds to an inner contour formed by an opening in the die, there remaining between the inner contour and outer contour a narrow annular gap in order to apply a pressing force from the inner side to the overlap region of the packaging components.

22 Claims, 6 Drawing Sheets

(51) Int. Cl.
   *B29C 33/48* (2006.01)
   *B29C 65/02* (2006.01)
   *B29L 31/00* (2006.01)
   *B29C 65/08* (2006.01)
   *B29C 65/10* (2006.01)

(52) U.S. Cl.
   CPC .... *B29C 66/1122* (2013.01); *B29C 66/24245* (2013.01); *B29C 66/5344* (2013.01); *B29C 66/542* (2013.01); *B29C 66/612* (2013.01); *B29C 66/63* (2013.01); *B29C 66/8161* (2013.01); *B29C 66/8227* (2013.01); *B29C 66/8244* (2013.01); *B29C 66/8324* (2013.01); *B29C 66/851* (2013.01); *B29C 65/08* (2013.01); *B29C 65/10* (2013.01); *B29C 66/72321* (2013.01); *B29C 66/72328* (2013.01); *B29C 66/72341* (2013.01); *B29L 2031/712* (2013.01); *B31B 2201/9085* (2013.01)

(58) Field of Classification Search
   USPC .................................. 156/73.1, 580.1, 580.2
   See application file for complete search history.

(56) References Cited

U.S. PATENT DOCUMENTS

| | | |
|---|---|---|
| 5,088,642 A | 2/1992 | Färber |
| 5,165,566 A | 11/1992 | Linner |
| 5,473,860 A * | 12/1995 | Linner ................... B29C 65/10 53/329.2 |
| 5,618,365 A | 4/1997 | Rebeyrolle et al. |
| 5,690,764 A | 11/1997 | Dirksing et al. |
| 5,871,430 A * | 2/1999 | Mueller ................... B31B 1/00 493/105 |
| 6,558,305 B1 | 5/2003 | Häggman |
| 6,764,576 B1 | 7/2004 | Heinonen et al. |
| 9,550,599 B2 | 1/2017 | Alther et al. |
| 2006/0130429 A1 | 6/2006 | Auer |
| 2009/0061037 A1 | 3/2009 | Sander |
| 2013/0193138 A1 | 8/2013 | Alther et al. |
| 2013/0305659 A1 | 11/2013 | Kenn et al. |

FOREIGN PATENT DOCUMENTS

| | | |
|---|---|---|
| CN | 101258020 A | 9/2008 |
| CN | 102883961 A | 1/2013 |
| CN | 103201094 A | 7/2013 |
| DE | 1063890 B | 8/1959 |
| DE | 1906796 A1 | 8/1970 |
| DE | 3942319 A1 | 6/1991 |
| DE | 4123487 A1 | 1/1993 |
| DE | 4142167 A1 | 6/1993 |
| DE | 69938301 T2 | 2/2009 |
| DE | 102010014993 A1 | 10/2011 |
| DE | 102010050502 A1 | 5/2012 |
| DE | 102013107429 B3 | 6/2014 |
| EP | 0247986 A1 | 12/1987 |
| WO | 8404507 A1 | 11/1984 |
| WO | 9416959 A1 | 8/1994 |

* cited by examiner

DEVICE AND METHOD FOR SEALING OVERLAPPING PACKAGING PARTS

CROSS-REFERENCE TO RELATED APPLICATIONS

This application is the United States national phase of International Application No. PCT/EP2014/070897 filed Sep. 30, 2014, and claims priority to German Patent Application No. 10 2013 111 230.7 filed Oct. 11, 2013, the disclosures of which are hereby incorporated in their entirety by reference.

BACKGROUND OF THE INVENTION

Field of the Invention

The invention first relates to a device for the fluid-tight sealing of two partially overlapping packaging components, one being a tubular base member, in particular formed from a blank of composite cardboard/plastics material, and an additional packaging component forming the upper packaging portion or packaging base, having at least one mandrel and one die, the mandrel having at least two expansion elements which are moved from the operating position thereof towards each other into a rest position to reduce the cross-section in order to allow ease of sliding-on of the tubular base member, the expansion elements having sealing jaws which, in the operating position thereof, form a closed circumferential outer contour which corresponds to an inner contour formed by an opening in the die, there remaining between the inner contour and outer contour a narrow annular gap in order to apply a pressing force from the inner side to the overlap region of the packaging components and the expansion elements each being pivotably arranged on a common base element, and a corresponding method for sealing.

Description of Related Art

Containers of a composite cardboard/plastics material for, in particular fluid, foodstuffs have been commercially available for some time in an extremely wide variety of shapes and formats. The composite structure, in addition to the carrier layer of cardboard and an inner and outer plastics material layer in each case, may also have other layers, such as, for example, an oxygen barrier layer of aluminium. With regard to the production thereof, a distinction is made in particular between containers from individual blanks and those containers which are produced from roll material on so-called tube forming machines.

In order to produce containers from individual blanks, an already grooved and printed blank is formed by sealing two opposing edges using a so-called longitudinal seam to form a so-called packaging cover, a tubular base member which is then closed at the dispenser to first form a container which is open at one side, formed and subsequently sterilised, filled, and which finally becomes a complete packaging by the other side being closed.

Most commercially available packagings are produced themselves at the ends thereof by means of folding and sealing of the tubular base member. For specific packaging shapes, an end can also be formed by a prefabricated shaping member as an additional packaging component which in turn can be prefabricated individually from plastics material or fibre material (pulp). It is thereby possible to produce any geometric constructions, in particular with regard to the size and arrangement of shaped opening or pouring elements.

Such a container is known from the German patent application DE 10 2010 014 993 A1. In this instance, the shaping member which forms the upper portion of the container is formed to be so large that the circumference thereof substantially corresponds to that of the tubular base member. However, this is not necessarily the case and containers are also known in which the cross-section of the tubular base member first narrows in order to then be able to be connected at the tapered end thereof to an upper portion (DE 10 2010 050 502 A1 or DE 39 42 319 A1).

Furthermore, a sealing device is also described in the older German patent application 10 2013 107 429.4 from the same applicant, the disclosure content of which is referred to with regard to the basic structure of the mandrel for this application. This mandrel has no leaf spring elements for pivotably securing the expansion elements.

Based on this, an object of the invention is to configure and develop a device corresponding method for sealing in such a manner that the kinematics and synchronisation of the expansion elements are optimised. Furthermore, it is desirable to have a simple, low-wear but also reliable and easily cleaned construction by means of which aseptic filled packagings can also be produced. In spite of high output speeds when operating the packaging machines that are equipped therewith, a uniform pressing force is intended to be provided over the entire circumference of the connection components during production.

This object is achieved with a device according to the invention in that each expansion element is secured to at least one torsion-resistant leaf spring element which enables precise pivoting of the respective expansion element between the rest position and operating position. In this manner, it is possible to determine, for example, in the case of a substantially square cross-section, precise direction vectors which are directed at 45° into the "corners" and which consequently also allow secure sealing at that location. Owing to the precise directional guiding, the wear of the surfaces which slide past each other can also be minimised.

According to the invention, the kinematics of the expansion elements is significantly improved by the leaf spring elements. Furthermore, the wear of the sealing elements and also of the guiding elements (resilient deformation at the material inner side) can be significantly reduced. Since the leaf spring elements are planar, individual components with smooth surfaces, the ease of cleaning of the mandrel is significantly improved. In particular, as a result of the precise guiding of the expansion elements, a uniform pressing force is applied over the entire circumference of the connection components and consequently optimal sealing of the packagings produced in this manner is achieved.

With regard to a method according to the invention, the object is achieved by carrying out the following steps:
 supplying an unfolded tubular base member,
 pushing the base member onto a mandrel which has expansion elements,
 supplying a die which has an opening,
 supplying an additional packaging component to the mandrel,
 introducing the connection heat,
 pressing the base member and additional packaging component against the die by unfolding the expansion elements in order to form a continuous outer contour in the contact region of the sealing jaws,
 connecting the base member and additional packaging component,
 folding-in the expansion elements,
 removing the die, and removing the unit comprising the base member and additional packaging component.
connecting the base member and additional packaging component,
folding-in the expansion elements,
removing the die, and
removing the unit comprising the base member and additional packaging component.

According to another aspect of teaching of the invention, the leaf spring elements are arranged in a substantially vertical manner and thus extend parallel with the extension direction of the expansion elements. Additional leaf spring elements may also be arranged horizontally. These additional leaf spring elements are preferably arranged between two opposing expansion elements. This arrangement reliably prevents deflection, rotation or tilting and consequently any torsion of the expansion elements.

Preferably, the vertically arranged leaf spring elements are secured in the lower portion of the expansion elements and the leaf spring elements themselves are secured, for example, to a base which is arranged on a mandrel wheel. In the device according to the invention, a plurality of base elements which have the foldable mandrels are preferably secured to a mandrel wheel. They are first arranged so as to be distributed over the circumference of the mandrel wheel and it is further possible, with mandrel wheels of an appropriate width, for a plurality of parallel-extending rows of mandrels arranged circumferentially also to be provided beside each other. In this manner, it is possible with a relatively small structural size to achieve large throughputs in the production or filling of packagings.

Since, in the preferred, previously mentioned construction, the expansion elements are connected to each other only in the lower region thereof, it is particularly advantageous when, according to another aspect of teaching of the invention, additional leaf spring elements are secured in the upper portion of the expansion elements and are secured with the lower free ends thereof to a common centring element. This centring element primarily serves to synchronise the movement processes when the expansion elements are unfolded and folded in. It is preferably retained only by means of the additional leaf spring elements and is not retained or guided in any other manner so that, when the expansion elements are unfolded or folded in, the centring element can move freely in a vertical direction.

An alternative embodiment makes provision for the leaf spring elements to extend over the entire length of the expansion elements as far as the sealing jaws.

An advantageous development of the invention makes provision for the expansion elements to be designed as magnet armatures, at least in the region of the sealing jaws thereof. If, in addition, the die then has one or more magnet coil(s) around the opening thereof, a particularly elegant and small drive solution can be produced. Preferably, the axial height of the magnet armatures corresponds to the height of the magnet coil(s). The magnetic forces on the expansion elements can be varied by means of a skilled selection of the inherent masses of the magnet armatures and the geometric construction and position thereof.

Another embodiment of the invention makes provision for the die to be formed in an integral manner over the circumference of the opening thereof. In this manner, the opening in the die can receive the mandrel and no additional drives or support elements are required in order to be able to absorb the reaction forces during the actual sealing operation.

According to another aspect of teaching of the invention, the die may also have elements for introducing the connection heat. In the case of connection by means of ultrasound welding, these elements for connection may comprise at least one ultrasound sonotrode within the die, the sealing jaws acting as an anvil in this instance. Alternatively, it is also possible for hot air openings to be provided within the die and/or within the sealing jaws as elements for introducing the connection heat if the introduction of connection heat is intended to be carried out by means of application of hot air.

In another embodiment of the invention, the supplying of the additional packaging component is carried out at the same time as the supplying of the die by the opening of the die being formed to secure the additional packaging component. In this instance, the removal of the die and the pulling off of the unit comprising the base member and additional packaging component can then also be carried out advantageously at the same time, whereby the number of necessary processing steps can be considerably reduced.

According to the invention, the unfolding and folding-in of the expansion elements are carried out in precisely determined directions. In this manner, an optimal application of an adequate pressing force can be achieved during the connection operation, particularly in the "corner regions".

According to another aspect of teaching of the invention, the connection itself can then be carried out by means of ultrasound or by means of hot air together with the pressing operation described above.

In the method according to the invention, it is either possible for the unfolding of the expansion elements to be carried out magnetically and the folding-in to be carried out by means of resilient force or, alternatively, the unfolding of the expansion elements can also be carried out with resilient force and the folding-in in magnetically. According to another embodiment of the invention, there is a third possibility that the reversal of the folding movement is carried out by means of magnetic pole reversal. The determination of the respective drive situation is dependent on various factors, such as, for example, the force distribution, energy use, structural size, in particular with smaller packaging formats, etc.

BRIEF DESCRIPTION OF THE DRAWINGS

The invention is explained in greater detail below with reference to drawings which illustrate a preferred embodiment. In the drawings.

DETAILED DESCRIPTION OF THE INVENTION

Figure 1:
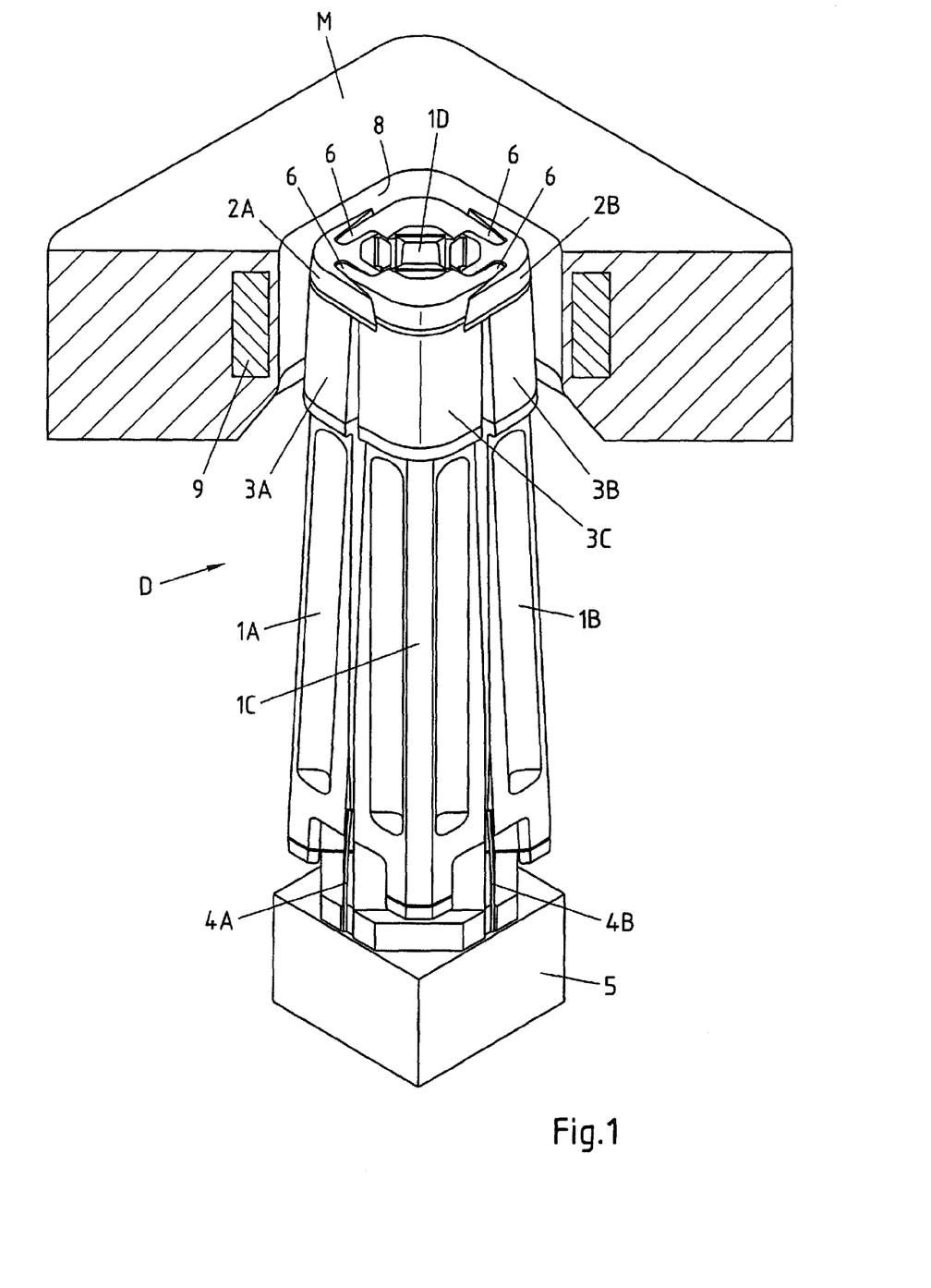
FIG. 1 is a perspective view of a mandrel in a diagonally sectioned die of a device according to the invention having expansion elements in the rest position.
Figure 6:
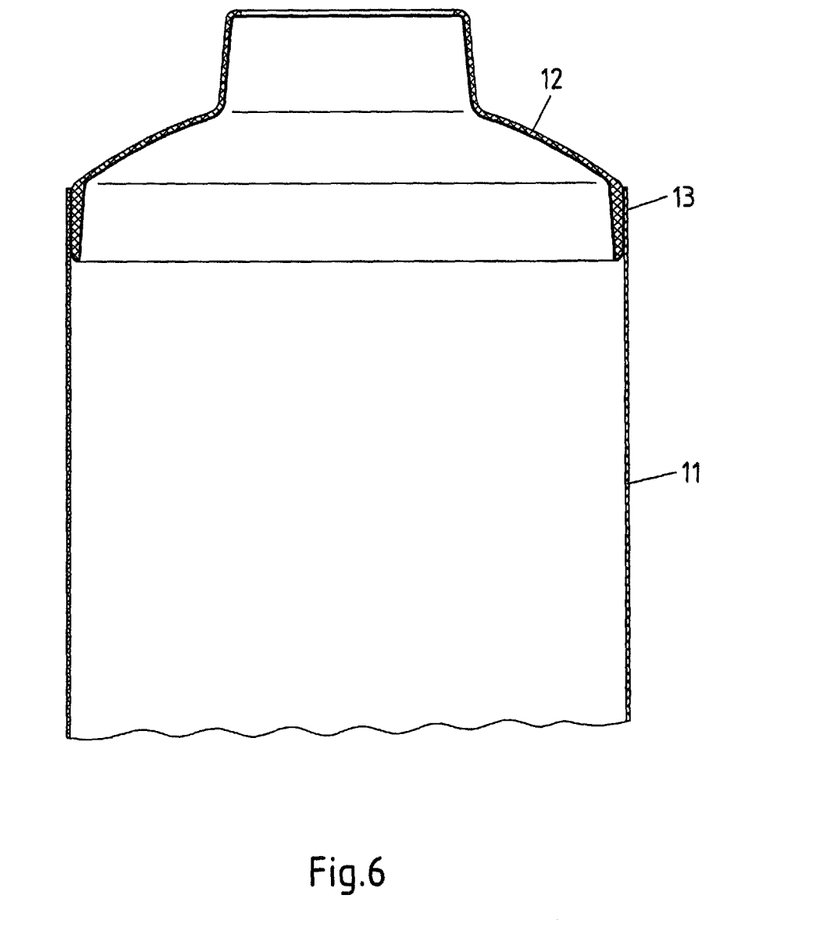
FIG. 6 is a vertical section of a container sealed according to the invention.

FIG. 1 first substantially shows a mandrel D of a device according to the invention for the fluid-tight sealing of a tubular base member 11 with an additional packaging component 12 (illustrated in FIG. 6 as an upper packaging portion). The mandrel D has in the embodiment shown and preferred in this regard four expansion elements 1A, 1B, 1C and 1D, which are pivotably connected to a base element 5 at the lower end thereof. The base element 5 in this instance is arranged so as to be secured on a mandrel wheel (not illustrated) generally with additional circumferentially arranged base elements.

Figure 2:
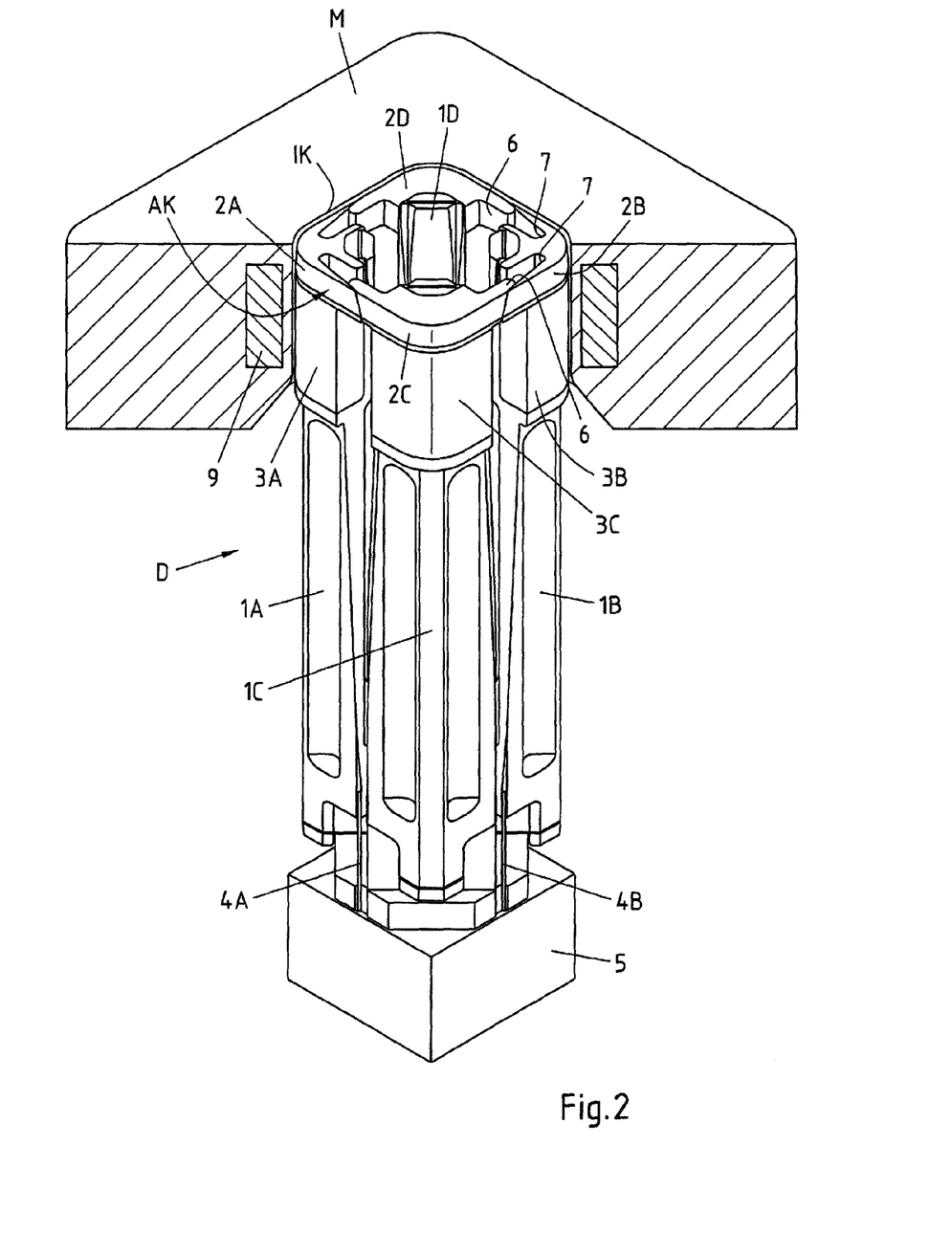
FIG. 2 is a perspective view of the mandrel in the die from FIG. 1 with expansion elements in an operating position.

The connection of the four expansion elements 1A, 1B, 1C and 1D to the base element is first carried out in this instance preferably by means of a vertically arranged torsion-free leaf spring element 4A, 4B, 4C, 4D which enables precise pivoting of the respective expansion element 1A, 1B, 1C, 1D between the rest position and operating position. These move precisely in the direction of the "corners" of the opening 8 of a die M which is arranged around the mandrel D in order to move from the rest position into the operating position thereof, as illustrated in FIG. 2. There, it can clearly be seen that the folded-out expansion elements 1A, 1B, 1C and 1D form a closed, circumferential outer contour AK which substantially corresponds to the inner contour IK of the opening 8 in the die M so that only a narrow annular gap remains. The die M is preferably provided at the lower side of the opening 8 thereof with a chamfer which is not illustrated in greater detail in order to form an upwardly tapering introduction portion. The free ends of the four expansion elements 1A, 1B, 1C and 1D are designed as sealing jaws 2A, 2B, 2C and 2D. Magnet armatures 3A, 3B, 3C, 3D are formed below the sealing jaws 2A, 2B, 2C, and 2D.

The magnet armatures 3A, 3B, 3C, 3D can be excited in order to expand the mandrel D by means of a magnet coil 9 which is preferably fitted inside the die M or close thereto. The structural height of the magnet armatures 3A, 3B, 3C and 3D in this instance substantially corresponds to the height of the magnet coil 9 arranged in the die M. This not only reduces the structural size of the expansion elements 1A, 1B, 1C and 1D considerably but also minimises the wear and maintenance complexity since it is possible to dispense with mechanical drive elements completely.

Figure 3:
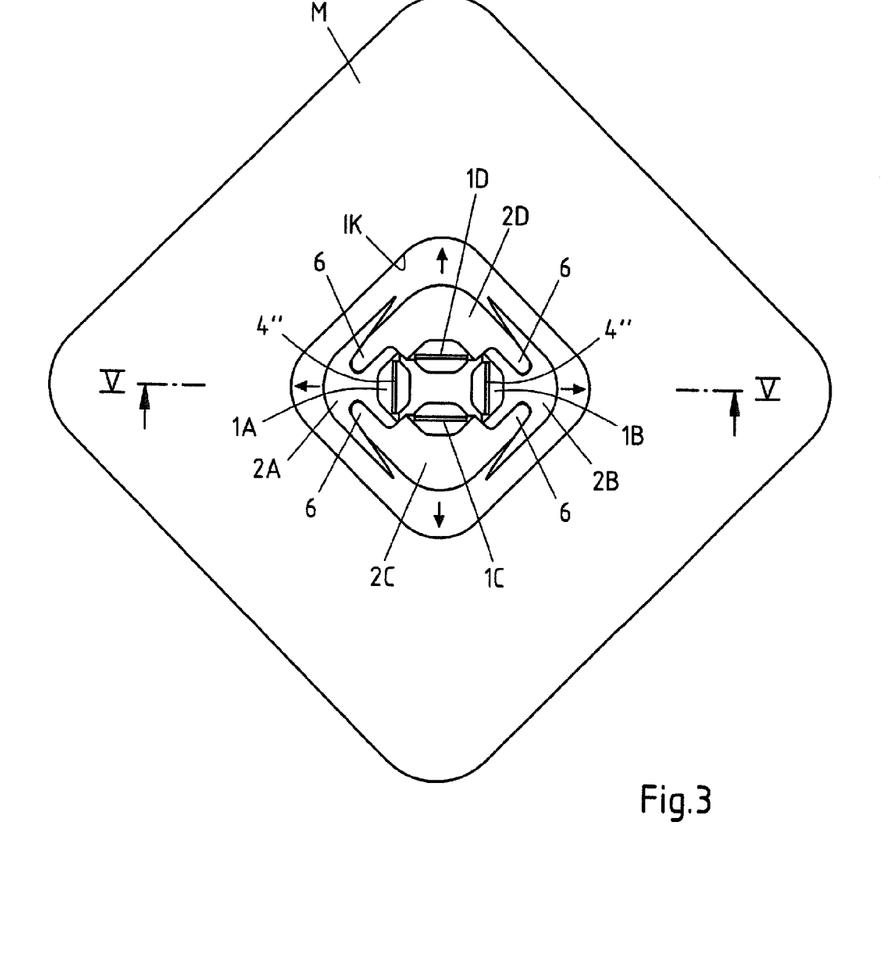
FIG. 3 is a plan view of the mandrel in the die from FIG. 1.

The precise interaction of the four expansion elements 1A, 1B, 1C and 1D can best be explained with reference to FIG. 3. In this instance, it can clearly be seen in a plan view of the illustration according to FIG. 1 that the two outer expansion elements 1A and 1B can be pivoted in the direction of the arrows from the rest position illustrated into an operating position, as shown in FIG. 2. The same applies to the two inner expansion elements 1C and 1D. The direction of motion is in this instance substantially predetermined by the vertical leaf spring elements 4A, 4B, 4C and 4D, which bring about a very precise linear movability in the direction of the arrows and prevent a deflection, rotation or tilting and consequently any torsion of the expansion elements.

In order to enable an unfolding movement or a folding-in movement, the two inner sealing jaws 2C and 2D each have two tongues 6 which can be received in corresponding grooves 7 (cf. FIG. 2) of the two outer sealing jaws 2A and 2B. In this instance, the surfaces of the respective adjacent sealing jaws move past each other without any friction. In this manner, the required energy consumption when the mandrel D is expanded can be minimised. Owing to the oblique flanks of the surfaces, there is further produced, as can be seen clearly in FIG. 2, the already-mentioned, closed circumferential outer contour AK of the sealing region of the sealing jaws 2A, 2B, 2C, 2D.

Figure 4:
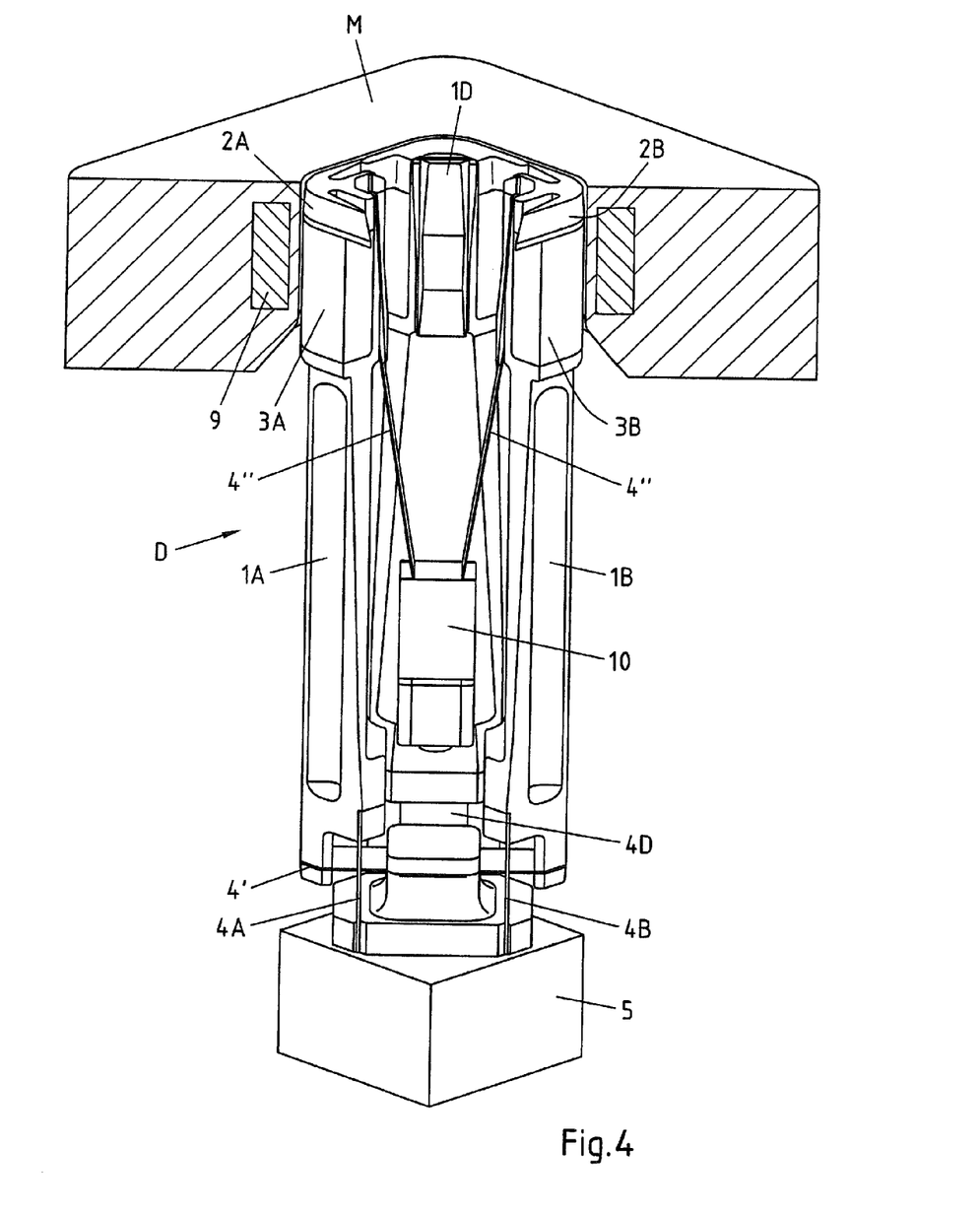
FIG. 4 shows the subject matter of FIG. 2, with the front expansion element being omitted.
Figure 5:
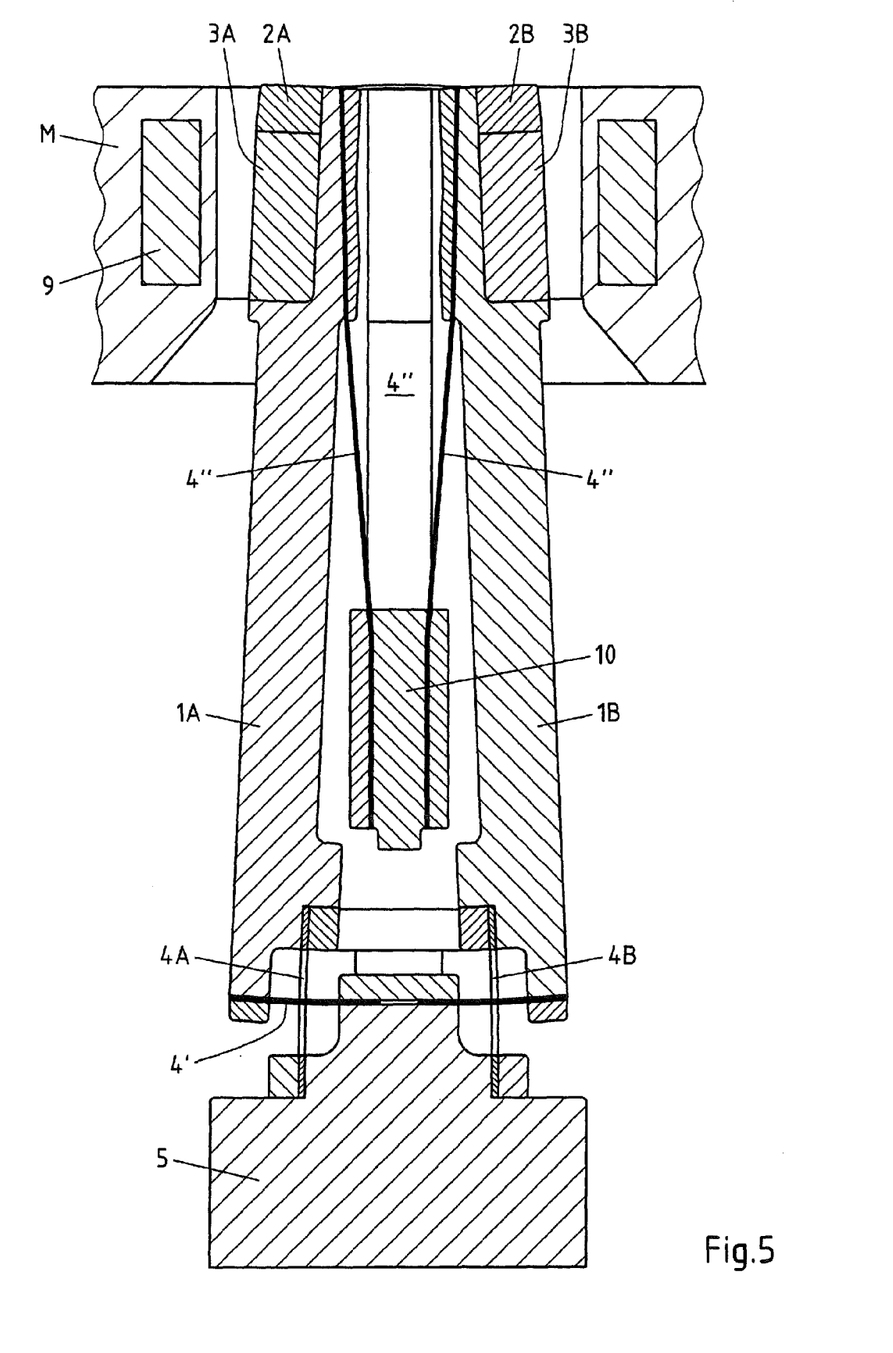
FIG. 5 is a vertical section along the line V-V of FIG. 3.

The precise structure of the device according to the invention can be seen particularly clearly in FIGS. 4 and 5, FIG. 4 corresponding to the illustration from FIG. 2, but with the illustration of the front expansion element being omitted for better clarity.

It can clearly be seen that, in order to further increase the guiding precision in the lower region of the expansion elements, additional leaf spring elements 4' are arranged horizontally between two opposing expansion elements, only the leaf spring element 4' being able to be seen between the two expansion elements 1A and 1B in this illustration.

In the embodiment illustrated and preferred in this regard, an even greater increase of the guiding precision is achieved in that the expansion elements in the upper region thereof have additional leaf spring elements 4" which are secured at the upper end thereof to the expansion elements 1A, 1B, 1C and 1D and with the lower free ends thereof to a centring element 10 which is arranged inside the expansion elements. In the embodiment illustrated, the centring element 10 is retained only by means of the additional leaf spring elements 4". Since these additional leaf spring elements 4" also cannot all be seen in FIG. 4, there is further shown in FIG. 5 in this regard a vertical section along the line V-V in FIG. 3, from which it can be seen that the additional leaf spring elements 4" extend from the upper portions of all the expansion elements 1A, 1B and 1D (not visible in the section), and are retained with the lower ends thereof in the centring element 10 which, when the expansion elements 1A, 1B, 1C, 1D are unfolded or folded in, ensures a precise guiding direction of the expansion elements and the synchronisation thereof and can be readily changed in terms of its position in the vertical direction.

FIG. 6 is finally a vertical section of a container produced according to the invention in which a tubular base member 11 surrounds an additional packaging component 12 in an overlap region 13. It can clearly be seen that, in order to connect the two packaging components 11, 12 from the inner side, a pressing force has to be applied in the region of the overlapping packaging components, which can be achieved with the device according to the invention in a reliable and elegant manner.

With the arrangement illustrated, it is possible to produce, for example, a packaging as known from DE 10 2010 014 993 A1 described in greater detail above. The cross-section thereof is substantially square, the "corners" having correspondingly large radii. It is expressly pointed out that the embodiment shown serves only to explain the claimed notion of the invention and is in no way intended to be limited thereto. Depending on the desired cross-section and/or format of the packagings to be produced, a large number of variations may be considered, without departing from the scope of the invention.

The invention claimed is:

1. A device for the fluid-tight sealing of two partially overlapping packaging components, one being a tubular base member, formed from a blank of composite cardboard/plastics material, and an additional packaging component forming the upper packaging portion or packaging base, having at least one mandrel and one die, the mandrel having at least two expansion elements which are moved from an operating position thereof towards each other into a rest position to reduce the cross-section in order to allow ease of sliding-on of the tubular base member, the expansion elements having sealing jaws which, in the operating position thereof, form a closed circumferential outer contour, which corresponds to an inner contour formed by an opening in the die, there remaining between the inner contour and outer contour a narrow annular gap in order to apply a pressing force from an inner side to an overlap region of the packaging components and the expansion elements, each being pivotably arranged on a common base element,
wherein
each expansion element is secured to at least one torsion-resistant leaf spring element which enables precise pivoting of the respective expansion element between the rest position and operating position.

2. The device of claim 1,
wherein
the leaf spring elements are arranged in a substantially vertical manner.

3. The device of claim 1,
wherein
additional leaf spring elements are arranged horizontally.

4. The device of claim 3,
wherein
an additional leaf spring element is in each case arranged between two opposing expansion elements.

5. The device of claim 4,
wherein
the leaf spring elements are secured in a lower portion of the expansion elements.

6. The device of claim 5,
wherein
additional leaf spring elements are secured in upper portion of the expansion elements and are secured with lower free ends thereof to a centering element.

7. The device of claim 6,
wherein
the centering element is retained only by means of the additional leaf spring elements.

8. The device of claim 7,
wherein
the leaf spring elements extend over an entire length of the expansion elements as far as the sealing jaws.

9. The device of claim 8,
wherein
the expansion elements are designed as magnet armatures, at least in the region of the sealing jaws thereof.

10. The device of claim 1,
wherein
the die is formed in an integral manner over the circumference of the opening thereof.

11. The device of claim 1,
wherein
the die has one or more magnet coil(s).

12. The device of claim 1,
wherein
the die has elements for introducing a connection heat.

13. The device of claim 12,
wherein
at least one ultrasound sonotrode is provided as elements for introducing the connection heat in the region of the die and in that the sealing jaws act as an anvil in this instance.

14. The device of claim 12,
wherein
hot air openings are provided as elements for introducing the connection heat within at least one of the die and the sealing jaws.

15. A method for the fluid-tight sealing of two partially overlapping packaging components, one being a tubular base member, in particular formed from a blank of composite cardboard/plastics material, and an additional packaging component forming the upper packaging portion or packaging base,
comprising the following steps:
supplying an unfolded tubular base member,
pushing the base member onto a mandrel which has expansion elements,
supplying a die which has an opening,
supplying an additional packaging component to the mandrel,
introducing a connection heat,
pressing the base member and additional packaging component against the die by unfolding the expansion elements in order to form a continuous outer contour in a contact region of sealing jaws,
connecting the base member and additional packaging component,
folding-in the expansion elements,
removing the die, and
removing a unit comprising the base member and additional packaging component.

16. The method of claim 15,
wherein
the supplying of the additional packaging component is carried out at the same time as the supplying of the die by the opening of the die being formed to secure the additional packaging component.

17. The method of claim 15,
wherein
the unfolding and folding-in of the expansion elements are carried out in precisely determined directions.

18. The method of claim 15,
wherein
the introduction of the connection heat is carried out by means of ultrasound.

19. The method of claim 15,
wherein
the introduction of the connection heat is carried out by means of hot air.

20. The method of claim 15,
wherein
the unfolding of the expansion elements is carried out magnetically and the folding-in is carried out by means of resilient force.

21. The method of claim 15,
wherein
the unfolding of the expansion elements is carried out with resilient force and the folding-in is carried out magnetically.

22. The method of claim 15,
wherein
a reversal of the folding movement is carried out by means of magnetic pole reversal.

* * * * *

UNITED STATES PATENT AND TRADEMARK OFFICE
CERTIFICATE OF CORRECTION

PATENT NO. : 9,757,899 B2
APPLICATION NO. : 15/027823
DATED : September 12, 2017
INVENTOR(S) : Martin Rügg Page 1 of 1

It is certified that error appears in the above-identified patent and that said Letters Patent is hereby corrected as shown below:

In the Claims

Column 6, Line 54, Claim 1, delete "member," and insert -- member --

Column 7, Line 25, Claim 6, before "upper" insert -- an --

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*